United States Patent Office 3,397,961
Patented Aug. 20, 1968

3,397,961
CARBON BLACK PROCESS
Merrill E. Jordan, Walpole, William Gerald Burbine, Whitman, Harvey M. Cole, Walpole, and David L. Petterson, Wollaston, Mass., assignors to Cabot Corporation, Boston, Mass., a corporation of Delaware
Filed May 6, 1965, Ser. No. 453,662
6 Claims. (Cl. 23—209.8)

ABSTRACT OF THE DISCLOSURE

Improved yields of relatively fine particle size carbon blacks are obtained by introducing at least 2% of the total molecular oxygen employed as a separate stream directly into the center of a relatively non-turbulent, upwardly directed, carbon producing flame feeding on a predominantly gaseous hydrocarbon which is preferably unsaturated while enveloping the upper 25 to 90% of said flame with a dense cloud of smoke. It is strongly preferred for best results that the separate molecular oxygen stream so introduced into the center of said flame be substantially more concentrated that ordinary air.

---

It is a principal object of the present invention to provide an improved process for producing carbon black.

It is another object of the present invention to provide a novel and versatile process for producing carbon black.

Other objects of the present invention will in part appear hereinafter and will in part be obvious.

In accordance with the present invention it was discovered that when a gaseous hydrocarbon and a free oxygen-containing gas are incompletely reacted in a certain type of flame which flame is partially enveloped in a cloud comprising carbon black entrained and/or suspended in a substantially inert gaseous medium, unexpectedly high yields of carbon black having an unexpectedly small average particle diameter and excellent color are produced.

Gaseous hydrocarbons suitable for the purposes of the present invention comprise any gaseous hydrocarbon which will burn in a flame in the presence of free oxygen, such as methane, butane, natural gas and benzene vapors, but preferably gaseous hydrocarbons such as ethylene, butylene, propylene and acetylene, i.e. normally gaseous unsaturated hydrocarbons are utilized. The use of acetylene is most preferred.

Free oxygen-containing gases suitable for the purposes of the present invention include air, oxygen and oxygen-enriched air, oxygen and oxygen-enriched air being greatly preferred as will be explained in more detail hereinafter. In accordance with the present invention, it is necessary that at least 2%, and preferably between about 4% and about 30%, by weight of the total free oxygen supplied to the reaction be introduced directly into the flame; that portion of the free oxygen is referred to as "primary oxygen." Free oxygen not introduced directly into the flame is referred to as "secondary oxygen" and is made available to the flame via the atmosphere about the flame as will be demonstrated in the examples hereinafter. It is pointed out, however, that all the free oxygen-containing gas to be utilized can, if desired, be introduced directly into the flame. In that event, a relatively cool gaseous medium should be continuously provided about the exterior confines of the flame. Said exterior cooling medium can be cooled tail gas or an inert gas such as nitrogen for example. The quantity of cooling medium provided is not normally critical, a suitable quantity being readily arrived at in practice.

Nitrogen and/or other inert gases can also be introduced directly into the flame if desired, for dilution. Needless to say, however, the quantity of inert gases introduced directly into the flame should not be so excessive as to cause undue dilution.

The present invention will be more readily understood and appreciated when reference is had to the accompanying drawings which illustrate apparatus suitable for the practice thereof wherein.

Figure 1:
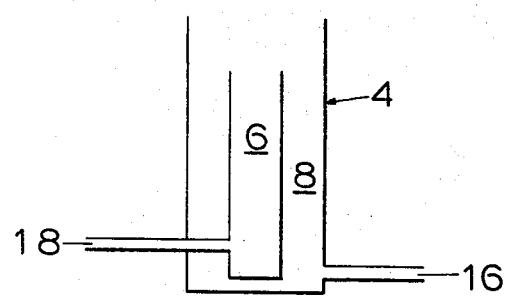
FIGURE 1 is a diagrammatic schematic illustration of a burner suitable for producing a relatively non-turbulent flame comprising well-defined adjacent zones.

In accordance with the present invention, the incomplete carbon-forming combustion reaction should be accomplished in a flame wherein the reactants when introduced into the flame are concentrated in adjacent zones. Such a flame can be produced for the purposes of the present invention in any suitable manner. For example, a relatively non-turbulent flame having well-defined zones is readily produced in a burner of the type illustrated in FIGURE 1 comprising concentrically positioned conduits. The gaseous hydrocarbon is introduced into one of the conduits, preferably outer conduit 8, while the primary free oxygen is introduced to the other conduit. The flow rates, size and length of the conduits, etc., are not in themselves critical as long as a stable flame comprising adjacent zones of a gaseous hydrocarbon and a free oxygen-containing gas is formed. In general, armed with the hereinabove information, one skilled in the art should encounter little difficulty in practicing the present invention as carbon-forming flames and flames of the type discussed hereinabove are well known in the art.

In accordance with the present invention, at least the upper portions of said flame must be enveloped in a cloud comprising a substantially inert medium containing carbon black entrained or suspended therein. The precise proportion of the length of the flame that should be enveloped in said cloud in any given situation can vary depending upon flow rates, the geometry of the flame and of the reaction chamber, the ratio of total free oxygen to hydrocarbon, the ratio of primary free oxygen to hydrocarbon, etc. In general, however, between about 25 and about 90% and preferably between about 35% and about 80% of the total length of the flame should be enveloped in said cloud. Envelopment of more than 90% of the flame in said cloud normally leads to an unstable flame. Accordingly, at least about 10% of the length of the flame is normally preferably not enveloped in said cloud.

Said cloud can be established in any suitable manner. A generally satisfactory procedure for start up and for establishing the cloud is as follows: A gaseous hydrocarbon, preferably a hydrocarbon which will be utilized subsequently in producing carbon black is incompletely reacted with a free oxygen-containing gas in a flame within an enclosed chamber to produce a "very smoky" flame. While said chamber must be provided with means for exiting the resulting carbon black and gaseous by-products, said exiting means during the start up period is partially obstructed or closed so as to remove less carbon black and gaseous by-products than are actually being formed. Maintenance of these conditions for a period of time results in the retention within the upper portions of said chamber of a relatively thick cloud comprising principally carbon black and gaseous by-products of the carbon black-forming reaction. The cloud as it becomes thicker and larger creeps downwardly in said chamber. When the bottom extremities of said cloud have enveloped as much of the flame as is desired, normally between about 25% and about 90% and preferably between about 35% and 80% of the length of the flame, the exiting means are readjusted to exit thereafter about as much of the carbon black/gaseous by-products cloud as is currently being produced. The quantity of hydrocarbon being introduced into the flame and the quantity of primary free oxygen (and secondary free oxygen if utilized) are also adjusted as required within the limits set forth above.

In addition to the gaseous hydrocarbon and the free oxygen-containing gas, it has been discovered that it is desirable to introduce normally liquid hydrocarbons such as No. 2 fuel oil, xylene, benzene, distillate fuels, residual oils and the like into the flame. Said normally liquid hydrocarbons can be introduced in vapor form or can be sprayed into the flame. The quantity of normally liquid hydrocarbon introduced to the flame is not generally critical. Quantities up to about 50 gals./hr. of said liquid hydrocarbon/1000 s.c.f.h. of gaseous hydrocarbon have been found to be entirely suitable.

Figure 3:
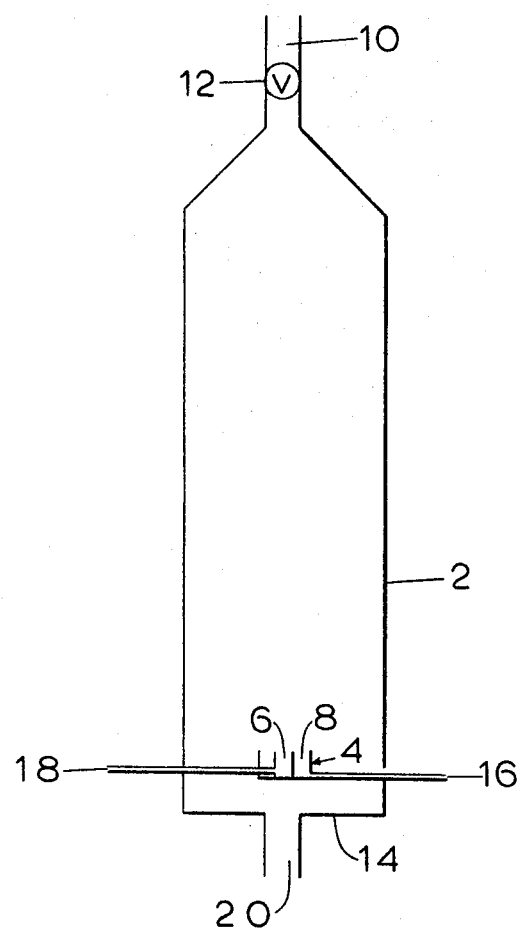
FIGURE 3 is a diagrammatic schematic illustration of apparatus suitable for the practice of the present invention.

The process of the present invention is preferably accomplished in an enclosed apparatus of the type illustrated in FIGURE 3 although similar apparatus lacking enclosing wall 14 can be utilized. The presence of wall 14 is preferred, however, because said wall allows complete control of the atmosphere about the flame which control is frequently most desirable.

The process of the present invention is both extremely efficient and extremely versatile. Most unexpectedly, however, high yields of valuable carbon blacks of extremely small average diameter and having excellent black color are readily producible in accordance with the present invention. This is most surprising since heretofore known processes somewhat similar to that of the present invention such as the process disclosed in U.S. 2,779,665 normally yield blacks of relatively coarse particle size and grayish color which blacks are not suitable for many purposes.

There follow a number of illustrative non-limiting examples: The scale values set forth in the following examples relate to the jetness or "blackness" of the carbon black product and were obtained by means of a "Cabot Nigrometer." Smaller scale values indicate a darker or more jet, and therefore normally more desirable, black.

Example 1

The apparatus utilized was of the type illustrated in FIGURE 3 wherein cylinder 2 was constructed of glass and had an ID of 4 inches and a length of 40 inches, and wherein burner 4 (of the type illustrated in FIGURE 1) having an OD of ⅜ inch and a length of 1⅜ inch was positioned approximately centrally, as shown, within cylinder 2 about 2 inches above wall 14. To the upper extremity of cylinder 2, there was connected conduit 10 equipped with adjustable valve 12. Conduit 10 was in turn connected to a standard carbon black recovery system (not shown) comprising a blower and three cyclones in series followed by a bag filter. After start up during which there was established in about the upper 30 inches of cylinder 2 a dense billowy cloud of carbon black and by-product gases by means of a "smoky acetylene/air flame," there was continuously fed to conduit 8, 12 s.c.f.h. acetylene by means of supply conduit 16. In this example a free oxygen-containing gas was not introduced into conduit 6 of burner 4. However, 55 s.c.f.h. air was introduced to cylinder 2 through conduit 20. A carbon black-forming flame which would normally have a length of about 20 inches, but the top 13 inches of which was in this case enveloped by said cloud, resulted. After about 5 hours, during which time a total of about 1.2 lbs. of carbon black was collected, the run was discontinued. The collected black was analyzed and was found to have a scale of about 91 and an average particle diameter (as determined by electron microscope examination) of about 48 millimicrons.

Example 2

This example was a duplicate of Example 1 except that about 2 s.c.f.h. air was fed directly into the flame by means of supply conduit 18 and conduit 6 and only 53 s.c.f.h. was introduced into cylinder 2 by means of conduit 20. The resulting carbon black-forming flame, having approximately the same dimensions as the flame produced in Example 1, was enveloped by the carbon black-containing cloud to approximately the same extent as in Example 1. After about 5 hours, during which time a total of about 1.32 lbs. of carbon black was collected, the run was discontinued. The collected black was analyzed and was found to have a scale of about 87 and an average particle diameter of about 40 millimicrons.

Example 3

This example was a duplicate of Example 2 except that a cloud of carbon black was not established within cylinder 2 either prior to or during the run. After 5 hours, a total of about 0.2 lb. of carbon black having a scale of about 87 and an average particle diameter of about 40 millimicrons had been produced.

In addition it was discovered, in accordance with the present invention, that when oxygen or oxygen enriched air is utilized as the free oxygen-containing gas introduced directly into the flame, further significant and unexpected improvement in the yield and quality of the resulting carbon black product results. Specifically, it was discovered that when primary free oxygen is provided as gaseous free oxygen or oxygen enriched air, a substantial further increase in carbon black yield and decrease in scale and average particle diameter results.

Example 4

This example was a duplicate of Example 2 except that instead of 2.0 s.c.f.h. air, 1.5 s.c.f.h. oxygen gas was fed to conduit 6 by way of conduit 18.

After about 5 hours, during which time a total of about 1.96 lbs. of carbon black was collected, the run was discontinued. The collected black was analyzed and was found to have a scale of about 84 and an average particle diameter of about 26 millimicrons.

Example 5

Figure 2:
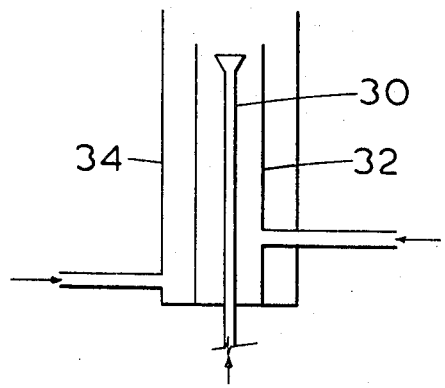
FIGURE 2 is a diagrammatic schematic illustration of another burner suitable for the purposes of the present invention when as preferred, a liquid hydrocarbon is also introduced into the flame.

The apparatus utilized in this example was a duplicate of the apparatus utilized in Example 1 except that the burner utilized was of the type illustrated in FIGURE 2, i.e. said burner consisted of three conduits, innermost conduit 30 terminating in a spray nozzle. The burner had an OD of ⅜ inch, innermost conduit 30 having an ID of 0.02 inch. After start up, during which as in Example 1 by means of a "smoky acetylene/air flame" there was established in about the upper 30 inches of cylinder 2 a dense billowy cloud of carbon black and by-product gases, there was continuously fed into innermost conduit 30, 0.25 gal./hr. of dodecane; to center conduit 32, 2.0 s.c.f.h. oxygen gas; and to outermost conduit 34, 12 s.c.f.h. acetylene. After about 5 hours, during which time a total of about 2.1 lbs. of carbon black was collected, the run was discontinued. The collected black was analyzed and was found to have a scale of about 85.5 and an average particle diameter of about 31 millimicrons.

Obviously, many changes can be made in the above examples, description and accompanying drawings without departing from the scope of the present invention. For example, while only acetylene was specifically utilized as the gaseous hydrocarbon in the preceding examples, and while acetylene is definitely preferred in the practice of the present invention, other gaseous hydrocarbons such as ethylene and butylene can be utilized.

Also, while in each of the above examples, the cloud of carbon black suspended in a gaseous medium was in each case produced at start up by means of a smoky flame within cylinder 2, said cloud can be produced by any suitable means, even outside of cylinder 2 and can then be introduced into cylinder 2 as needed.

Accordingly, it is intended that the above disclosure be regarded as illustrative and as in no way limiting the scope of the invention.

What is claimed is:

1. In a process for making carbon black by the incomplete combustion of a predominantly gaseous hydrocarbon in a stable, relatively non-turbulent, upwardly extending flame with the product carbon black being continuously removed as a hot aerosol from about said flame the improvement which comprises controlling the relative removal rate of said hot aerosol in such a way as to cause a thick cloud of smoke to envelope and surround the upper 25 to 90% of the overall vertical dimension of said flame while supplying a relatively cool gaseous medium around the exterior of said flame at the bottom and introducing separately from any hydrocarbon constituents a stream of molecular oxygen containing gas directly into the center of said flame at the bottom thereof in an amount sufficient to supply at least about 2% by weight of the total molecular oxygen used.

2. The process of claim 1 wherein said stream of molecular oxygen containing gas is substantially pure oxygen and the gaseous medium supplied about the exterior of said flame is air.

3. The process of claim 1 wherein said stream of molecular oxygen containing gas comprises between about 4 and about 30% by weight of the total molecular oxygen used.

4. The process of claim 1 in which the primary constituents of said predominantly gaseous hydrocarbon are unsaturated molecules.

5. The process of claim 4 wherein said unsaturated molecules are selected from the group consisting of ethylene, butylene and acetylene.

6. The process of claim 4 in which acetylene is the primary constituent.

References Cited

UNITED STATES PATENTS

| | | | |
|---|---|---|---|
| 1,617,071 | 2/1927 | Matlock | 23—209.8 |
| 1,999,541 | 4/1935 | Keller | 23—209.8 |
| 2,597,991 | 5/1952 | Heller | 23—209.8 |
| 2,779,665 | 1/1957 | Heller | 23—209.8 |
| 3,003,855 | 10/1961 | Heller et al. | 23—209.4 |

FOREIGN PATENTS

| | | |
|---|---|---|
| 461,497 | 2/1937 | Great Britain. |

OSCAR R. VERTIZ, *Primary Examiner.*